US008239883B2

(12) United States Patent
Saito

(10) Patent No.: US 8,239,883 B2
(45) Date of Patent: Aug. 7, 2012

(54) INFORMATION PROCESSING APPARATUS AND METHOD, PROGRAM, AND STORAGE MEDIUM

(75) Inventor: Megumi Saito, Chuo-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1073 days.

(21) Appl. No.: 11/385,935

(22) Filed: Mar. 21, 2006

(65) Prior Publication Data
US 2006/0224780 A1 Oct. 5, 2006

(30) Foreign Application Priority Data

Mar. 29, 2005 (JP) ................................. 2005-095697

(51) Int. Cl.
G06F 3/00 (2006.01)
G06F 9/44 (2006.01)
G06F 9/46 (2006.01)
G06F 13/00 (2006.01)

(52) U.S. Cl. ..................................................... 719/321
(58) Field of Classification Search ....... 710/8; 719/321
See application file for complete search history.

(56) References Cited

U.S. PATENT DOCUMENTS

| 6,449,050 | B1* | 9/2002 | Haikin ............................ 358/1.1 |
| 6,825,941 | B1* | 11/2004 | Nguyen et al. ............... 358/1.15 |
| 6,831,752 | B1 | 12/2004 | Matsuo |
| 2002/0067504 | A1* | 6/2002 | Salgado et al. ............. 358/1.15 |
| 2003/0053105 | A1 | 3/2003 | Morooka et al. |
| 2003/0184782 | A1* | 10/2003 | Perkins et al. ............... 358/1.13 |
| 2004/0223182 | A1* | 11/2004 | Minagawa ................... 358/1.15 |
| 2005/0039193 | A1* | 2/2005 | Choi et al. ..................... 719/321 |

FOREIGN PATENT DOCUMENTS

| JP | 8-278871 A | 10/1996 |
| JP | 2003-208276 A | 7/2003 |
| JP | 2004-152090 A | 5/2004 |
| KR | 2003-24772 A | 3/2003 |

* cited by examiner

Primary Examiner — Andy Ho
Assistant Examiner — Timothy A Mudrick
(74) Attorney, Agent, or Firm — Canon U.S.A., Inc., IP Division

(57) ABSTRACT

The present invention provides an information processing apparatus, which is configured to customize a device driver that is adapted to control a printer, by setting a property. The information processing apparatus includes a specifying unit adapted to specify a plurality of device drivers, and a setting unit adapted to set, in response to one device-driver customization instruction, property information, which corresponds to a device driver, in the plurality of device drivers specified by the specifying unit.

26 Claims, 15 Drawing Sheets

FIG.7

700 — inf file for Windows® 98/Me

...
[Version]
730 — Signature="$CHICAGO$"
Class=Printer
Provider=%CANON%
DriverVer=11/27/2004, 10.60.0.7
...

710 — inf file for Windows® NT4.0

...
[Version]
740 — Signature="$Windows NT$"
Provider=%CANON%
LayoutFile=cnl40jnt.inf
ClassGUID={4D36E979-E325-11CE-BFC1-08002BE10318}
Class=Printer
DriverVer=11/27/2004, 10.60.0.7

...
[Strings]
CANON="Canon"
CLASSNAME="Printer"
NS_LMON_CPCA="CPCA Language Monitor2, AUCPLMNT.DLL"
760 — DISK1="LIPS4 Printre Driver for Microsoft Windows NT Version 4.0 Version 10.60 Installer Disk"

720 — inf file for Windows® 2000/XP/Server 2003

...
[Version]
750 — Signature="$Windows NT$"
Provider=%CANON%
ClassGUID={4D36E979-E325-11CE-BFC1-08002BE10318}
Class=Printer
DriverVer=11/27/2004, 10.60.0.7
CatalogFile.NTx86=CNL.40J.CAT ...
[Strings]
CANON="Canon"
NS_LMON_CPCA="CPCA Language Monitor2, AUCPLMNT.DLL"
770 — DISK1="LIPS4 Printre Driver for Microsoft Windows 2000/XP/Server 2003 Version 10.60 Installer Disk"

| API | PSEUDO-API NAME |
|---|---|
| GetVersionEx | CSPL_GetVersionEx |
| OpenPrinter | CSPL_OpenPrinter |
| ClosePrinter | CSPL_ClosePrinter |
| SetPrinter | CSPL_SetPrinter |
| GetPrinter | CSPL_GetPrinter |
| GetPrinterDriver | CSPL_GetPrinterDriver |
| SetPrinterData | CSPL_SetPrinterData |
| GetPrinterData | CSPL_GetPrinterData |

FIG.18

```
typedef struct_devicemode{   /*dvmd*/
    TCHAR   dmDeviceName[32];
    WORD    dmSpecVersion;
    WORD    dmDriverVersion;
    WORD    dmSize;
    WORD    dmDriverExtra;
    DWORD   dmFields;
    short   dmOrientation;
    short   dmPaperSize;
    short   dmPaperLength;
    short   dmPaperWidth;
    short   dmCopies;
}DEVMODE;
```

INFORMATION PROCESSING APPARATUS AND METHOD, PROGRAM, AND STORAGE MEDIUM

CROSS-REFERENCE TO RELATED APPLICATIONS

This application claims priority from Japanese Patent Application No. 2005-095697 filed Mar. 29, 2005, which is hereby incorporated by reference herein in its entirety.

BACKGROUND OF THE INVENTION

1. Field of the Invention

The present invention relates to an information processing technique or customizing a device driver.

2. Description of the Related Art

Hitherto, there has been a demand for customizing a print control program (a printer driver) for controlling a printer, according to an installation environment of a printing system. This demand has become more acute in recent years, because of the diverse nature of customer's conditions and installation places for printing systems.

To meet the demands, conventionally, a customization technique (a customization system) has been provided, which enables changing default values set for a printer driver in a printer, and also enables achieving an input control (hereunder referred to as a disabling process) by designating items, the setting of which cannot be changed according to the conditions of use by a user, in a user interface (hereunder abbreviated to "UI") of a printer driver. Under this control technique input data corresponding to the designated items is rejected.

The related art is described in, for example, Japanese Patent Application Laid-Open Nos. 8-278871 and 2003-208276.

However, in this customization system, it is first necessary to create an installation set for installation of the printer driver in an operating system (OS) that supports the printer driver. In an environment thereof, a tool used to create the installation set of the customized printer driver has to be activated.

Also, even when customizing a plurality of printer drivers involved in one driver set, a customizing program can customize only one printer driver (corresponding to one model of a printer) at a time. Therefore, when customizing a plurality of printer drivers, it is first necessary for the program to customize one of the plurality of printer drivers, which corresponds to one model of a printer, and then to subsequently and similarly customize the next printer driver.

This is because the conventional customization tool can only customize a driver having been installed in an information processing apparatus. To customize another driver, the tool must be reactivated after the first driver is installed in the apparatus.

In a case where an administrator creates several customized drivers, each corresponding to a different kind of printer provided in a network environment, the administrator should iteratively perform a similar customization procedure corresponding to each kind of printer. This imposes a large burden on the administrator. Also efficiency in creating the customized drivers is low.

SUMMARY OF THE INVENTION

An object of the present invention is to enhance operability of customizing a device driver.

Another object of the present invention is to enable customization of a plurality of printer drivers in one customization process.

In one aspect of the present invention, an information processing apparatus, which is configured to customize a device driver that is adapted to control a printer, by setting a property, includes a specifying unit adapted to specify a plurality of device drivers, and a setting unit adapted to set, in response to one device-driver customization instruction, property information, which corresponds to a device driver, in the plurality of device drivers specified by the specifying unit.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a diagram showing three INF files that describe installation information on printer drivers.

FIG. 18 is a diagram showing an example of customization data used to customize a device driver.

DETAILED DESCRIPTION OF THE EMBODIMENTS

Embodiments of the invention will now be described in detail with reference to the accompanying drawings. In the following description of the embodiments, a method of customizing printer drivers in Windows (registered trademark), that is, OSs (operating systems) for PCs (personal computers), which are manufactured by Microsoft (registered trademark) Corporation, is described by way of example. The invention can equally well be applied to other operating systems, such as for example Linux or Mac OS X.

Figure 1:
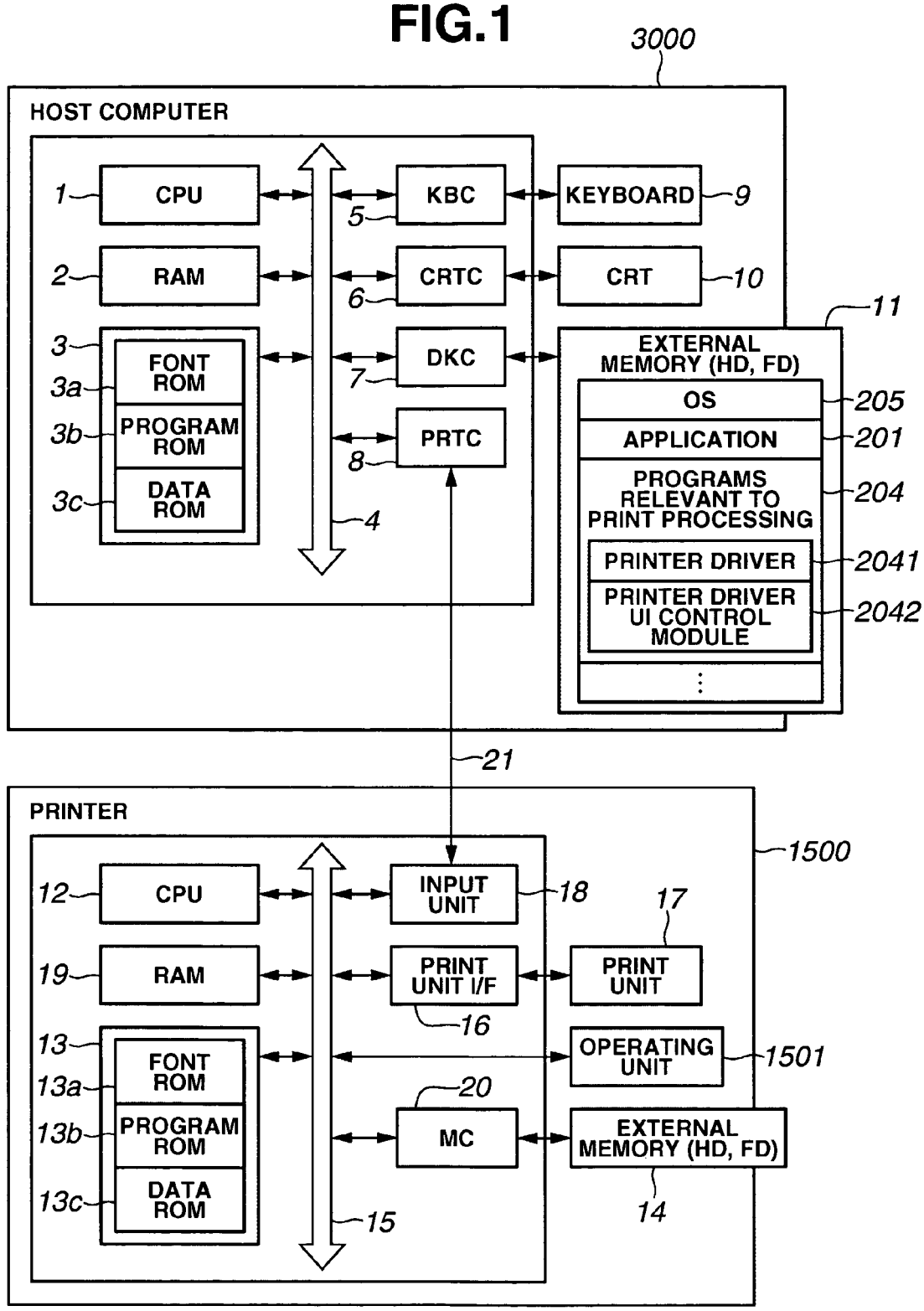
FIG. 1 is a block diagram showing the configuration of a printing system according to an embodiment of the present invention.

FIG. 1 is a block diagram showing the configuration of a printing system according to an embodiment of the present invention. This printing system includes an information processing apparatus (hereunder referred to also as a "host computer") 3000 and a printer 1500 adapted to receive print data from the host computer 3000 and to perform printing.

In the host computer 3000, a CPU (central processing unit) 1 comprehensively controls devices connected to a system bus 4 according to programs stored in a RAM (random access memory) 2. The RAM 2 functions also as a main memory and a work area for the CPU 1. A ROM (read-only memory) 3 stores various kinds of programs and data and is divided into a font ROM 3a adapted to store various kinds of fonts, a program ROM 3b adapted to store a boot program and a BIOS (basic input/output system), and a data ROM 3c adapted to store various kinds of data.

A keyboard controller (KBC) 5 is adapted to control key input data from a keyboard (KB) 9 and a pointing device (a mouse (not shown)). A CRT controller (CRTC) 6 is adapted to control the display of data in a CRT display (CRT) 10. A disk controller (DKC) 7 is adapted to control an access to an external memory 11, such as a hard disk. A printer controller (PRTC) 8 is connected to the printer 1500 through a bidirectional interface 21 and is adapted to perform communication control with the printer 1500.

The external memory 11 is, for example, a hard disk (HD), a magnetooptic disk (MO), and a floppy (registered trademark) disk (FD). As shown in the figure, the external memory 11 stores user files and edit files in addition to an operating system (OS) 205, various application programs (for instance, a document processing program adapted to process a document in which a figure, an image, a character, and a table coexist) 201, and programs relevant to print processing 204. The programs relevant to print processing 204 are adapted to create print data described by a page description language, and can be utilized in common by a plurality of printers of the same system. The programs relevant to print processing 204 include also a printer control command generating module (hereunder referred to as a printer driver) 2041, and a printer driver UI control module 2042.

The application programs 201 stored in the external memory 11, which include a customization program (hereunder referred to simply as a customization tool) according to the present embodiment, is loaded to the RAM 2 and is executed by the CPU 1. The CPU 1 performs outline font development (or rasterization) and enables a WYSIWYG (What You See Is What You Get) display on the screen of the CRT display 10. Also, the CPU 1 opens various kinds of registered windows and performs various kinds of data processing according to a command, which is designated with a mouse cursor (not shown) on the screen of the CRT display 10. When performing printing, a user can open a print setting window (controlled by the printer driver UI control module 2042) and perform printer setting, and print processing setting on the printer driver 2041, which includes a print mode selection.

Next, the configuration of the printer 1500 is described. The CPU 12 controls operation of the entire printer 1500. A RAM 19 functions as a main memory and a work area for the CPU 12, and is used also as an output information rasterization area and an environment data storage area. Also, the RAM 19 has a NVRAM (anon-volatile RAM) area and is configured so that the capacity thereof can be increased by an optional RAM connectable to an expansion port (not shown). A ROM 13 includes a font ROM 13a adapted to store various kinds of fonts, a program ROM 13b adapted to store a control program executed by the CPU 12, and a data ROM 13c adapted to store various kinds of data. An input portion 18 transmits and receives data to and from the host computer 3000. A printing portion interface (I/F) 16 is adapted to control an interface to a printing portion 17 serving as a printer engine.

A memory controller (MC) 20 controls an access to the external memory 14 that may include, for example, a hard disk (HD), a magnetooptic disk (MO), a floppy (registered trademark) disk (FD), and/or an IC (integrated circuit) card. The external memory 14 stores font data and emulation programs, and form data. In a case where the external memory 14, such as a hard disk, is not connected thereto, information utilized in the host computer 3000 is stored in the data ROM 13c of the ROM 13. The number of the external memories 14 is not limited to 1 but may be plural. For example, the printer 1500 may be configured so that an optional font card is added to internal fonts, and that a plurality of external memories storing a program adapted to interpret printer control languages of different language systems can be connected thereto.

An operation panel adapted to accept a user's operation is provided in an operation portion 1501. Switches and LED indicators (not shown) for operations are disposed in the operation panel. The operation portion 1501 may have a NVRAM (a non-volatile RAM (not shown)) adapted to store printer setting information sent from the operation panel.

The CPU 12 outputs an image signal as output information, to the printing portion (printer engine) 17 through the printing portion interface 16 according to the control program stored in the program ROM 13b of the ROM 13. The CPU 12 can perform communication with the host computer 3000 though the input portion 18, and is configured to receive print data sent from the host computer 3000 and to notify the host computer 3000 of information outputted from the printer 1500.

Figure 2:
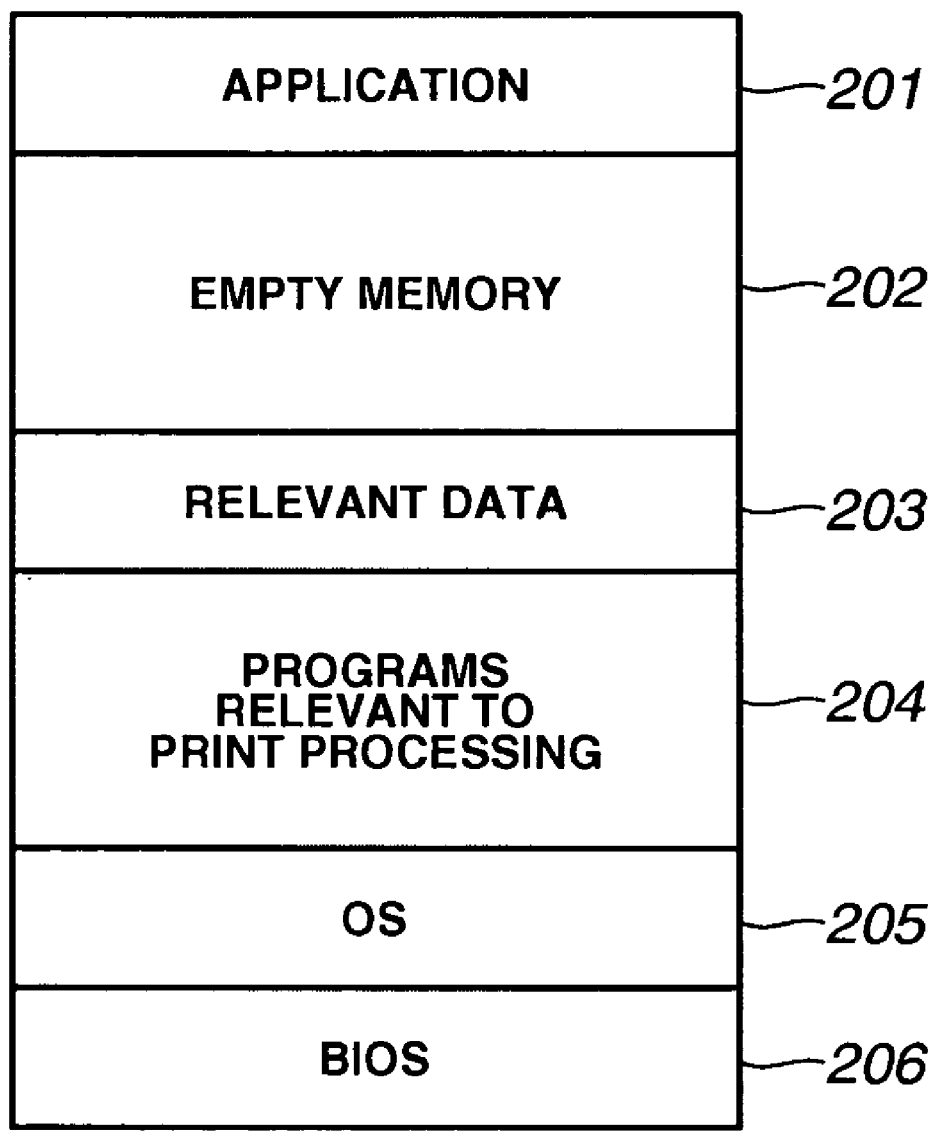
FIG. 2 is diagram showing the memory map of a RAM 2 in a state in which a program and data are loaded into the RAM 2 of a host computer 3000 after a predetermined application program and programs relevant to print processing are activated.

FIG. 2 is diagram showing the memory map of the RAM 2 in a state in which a program and data are loaded into the RAM 2 of the host computer 3000 after a predetermined application program and predetermined programs relevant to print processing are activated.

As shown in this figure, the BIOS 206, the OS 205, the application programs 201, the programs relevant to print processing 204 and relevant data 203 are loaded into the RAM 2. Also, an empty memory area 202 is ensured. Consequently, the application program 201 and the programs relevant to print processing can be executed. The printer driver UI control module 2042 (see FIG. 1) included in the programs relevant to print processing displays a print setting window on the screen of the CRT display 10 in response to a print setting command from a user and enables the user to perform the setting by the keyboard 9.

Figure 3:
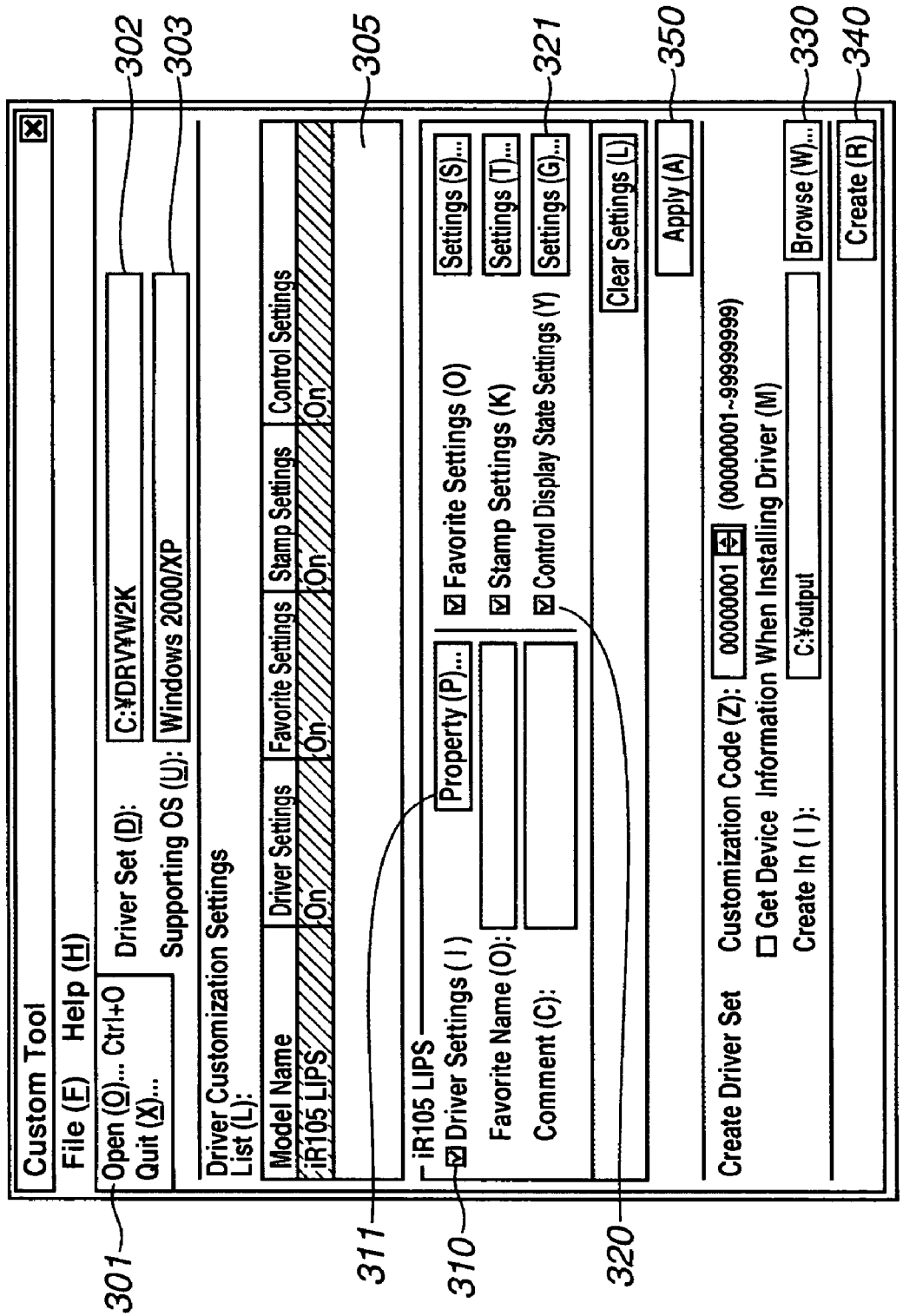
FIG. 3 is a diagram showing a UI of a customization tool.

FIG. 3 is a diagram illustrating an example of a UI of the customization tool. The customization tool operates on Windows (registered trademark) 2000/XP/Server 2003 and customizes, for example, printer drivers for Windows (registered trademark) 98/ME, Windows (registered trademark) NT4.0, and Windows (registered trademark) 2000/XP/Server 2003. However, a supporting OS according to the invention is not limited thereto. Emulation of operations of the application program interface (API) corresponding to the OS is possible utilizing a pseudo API (to be described in detail later) without actually installing a printer driver. The emulation of the API can be supported by changing or adding the setting of an argument of an individual function.

When a user designates "Open" in a menu 301 shown in FIG. 3, a dialogue box (not shown) used to designate a folder of a driver set to be customized is displayed. Thus, a storage location of a driver to be customized can be designated. The designated folder is indicated in a display field 302. The OS corresponding to the designated driver set is indicated in a display field 303.

Figure 19:
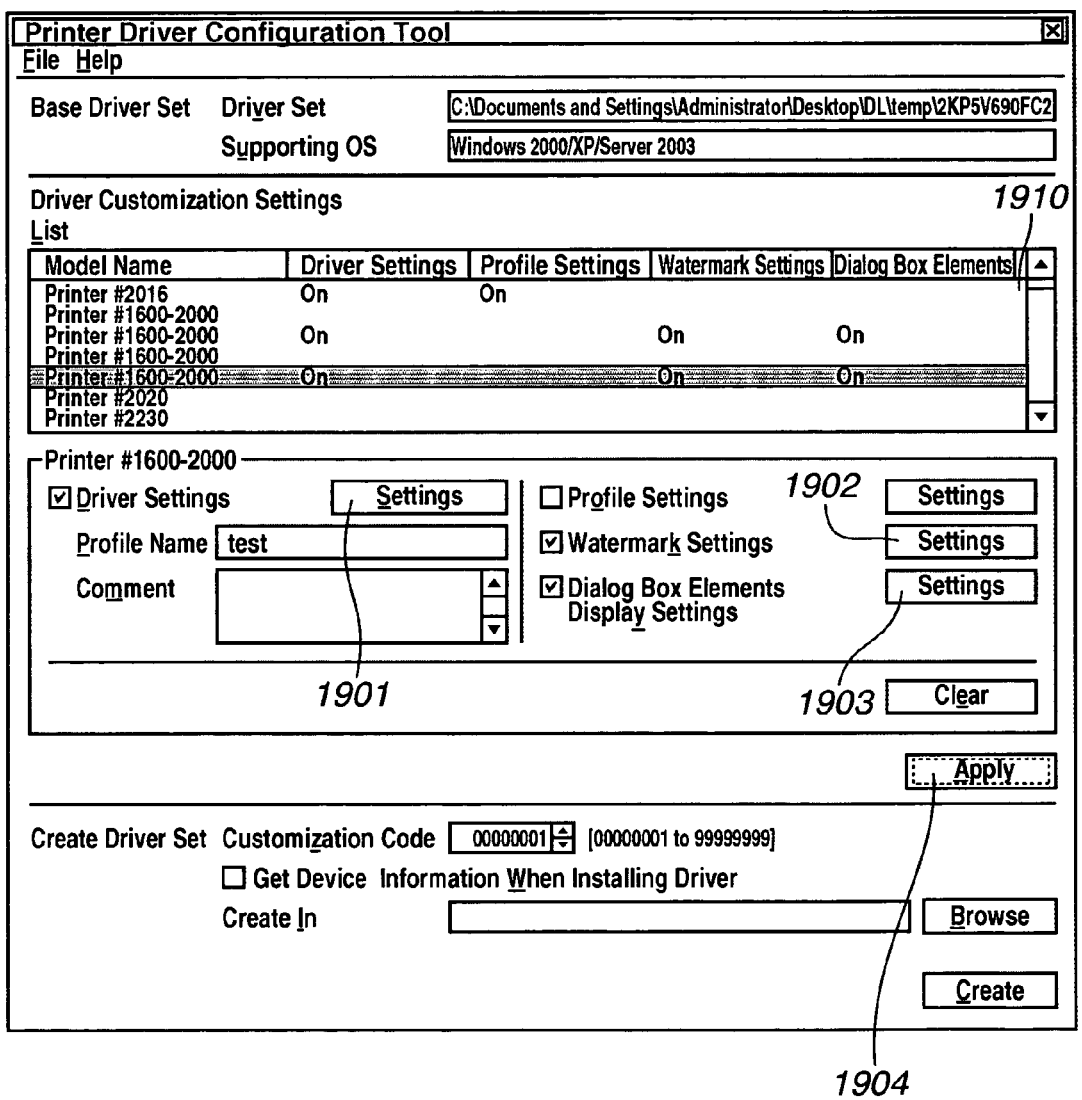
FIG. 19 is a diagram showing a UI of a tool used to customize a plurality of drivers.

In the case where a plurality of printer drivers (referred to as "PRINTER MODEL" in FIGS. 14 to 16) corresponding to a model of a printer is stored in a folder of one driver set, a plurality of printer drivers is listed (see FIG. 19) when a customized driver is created. The customization tool determines whether customization information (or customization data) is set corresponding to each of the listed printer drivers. Then, the customization tool creates a customized driver associated with the printer driver, to which the customization data is set. This processing is described in detail in the description of step S608 shown in FIG. 6 and of a flowchart shown in FIG. 17. This processing can be achieved using the pseudo API. In this case, a driver, which is to be customized, is not brought into an operable state by installing onto the OS so as to be recognized by the OS. Thus, drivers can be customized one after another. In a display field 1910 shown in FIG. 19, a list of printer drivers is displayed. Each driver to be customized is selected and is displayed in reverse video. Then, buttons 1901 to 1903 are pushed to thereby customize the drivers. Subsequently, a plurality of customized drivers can be generated by depressing a customization button 1904. Consequently, a customization tool is provided by depressing the customization button 1904 only once and serves as an installation set including a plurality of customized drivers.

The customization data includes various data, such as control data, which is used to perform display/nondisplay of control items of the UI of a device driver, and set values for a device driver, which are shown in FIG. 18.

FIG. 18 shows an example of a data structure in a device mode (DEVMODE).

This figure shows the manner of storing data (dmOrientation) representing an orientation of paper, data (dmPaperSize) representing the size of paper, data (dmPaperWidth) representing the width of paper, and data (dmCopies) representing the number of copies. Additionally, this DEVMODE data structure is stored in a registry. Data representing a default print setting environment or a "profile" (to be described below) is read and can be reflected to the UI of a printer driver 2041 by writing data to or reading data from the DEVMODE data structure stored in the registry.

The "profile" is a set of a plurality of print setting data corresponding to the printer driver 2041. A user can obtain a desired operation environment by designating the "profile", which includes a set of setting data, in the UI of the printer driver 2041. For example, in the case where a user often uses a watermark and a staple, a set of setting data including watermark setting data and staple setting data is preliminarily registered as a profile. Thus, the user can set a plurality of setting items at desired values only by selecting the "profile" to achieve printing. The customization tool holds such data as customization data, which is an example of property information, and writes this data to a an UPD file or GPD (Generic Printer Driver) file or UPD file, which is described later. A GPD file is substantially the same structure to an UPD file. Printer driver can be customized by modifying UPD file but also GPD file in this embodiment.

In a list view 305, a specifying indication "On" is displayed corresponding to each model of printer, which correspond to printer drivers to be customized, and customized information. When a check box 310 is checked, the button 311 becomes valid. When the button 311 is depressed, the UI of the printer driver to be customized (see FIG. 4) is displayed. Initial values of print setting data (document property data) and device setting data (printer property data) can be set.

When a check box 320 is checked, a button 321 becomes valid. When the button 321 is depressed, a UI (see FIG. 5) used to customize a method of displaying control items on the printer driver UI is displayed. Thus, the method of displaying control items on the printer driver UI can be set.

Figure 4:
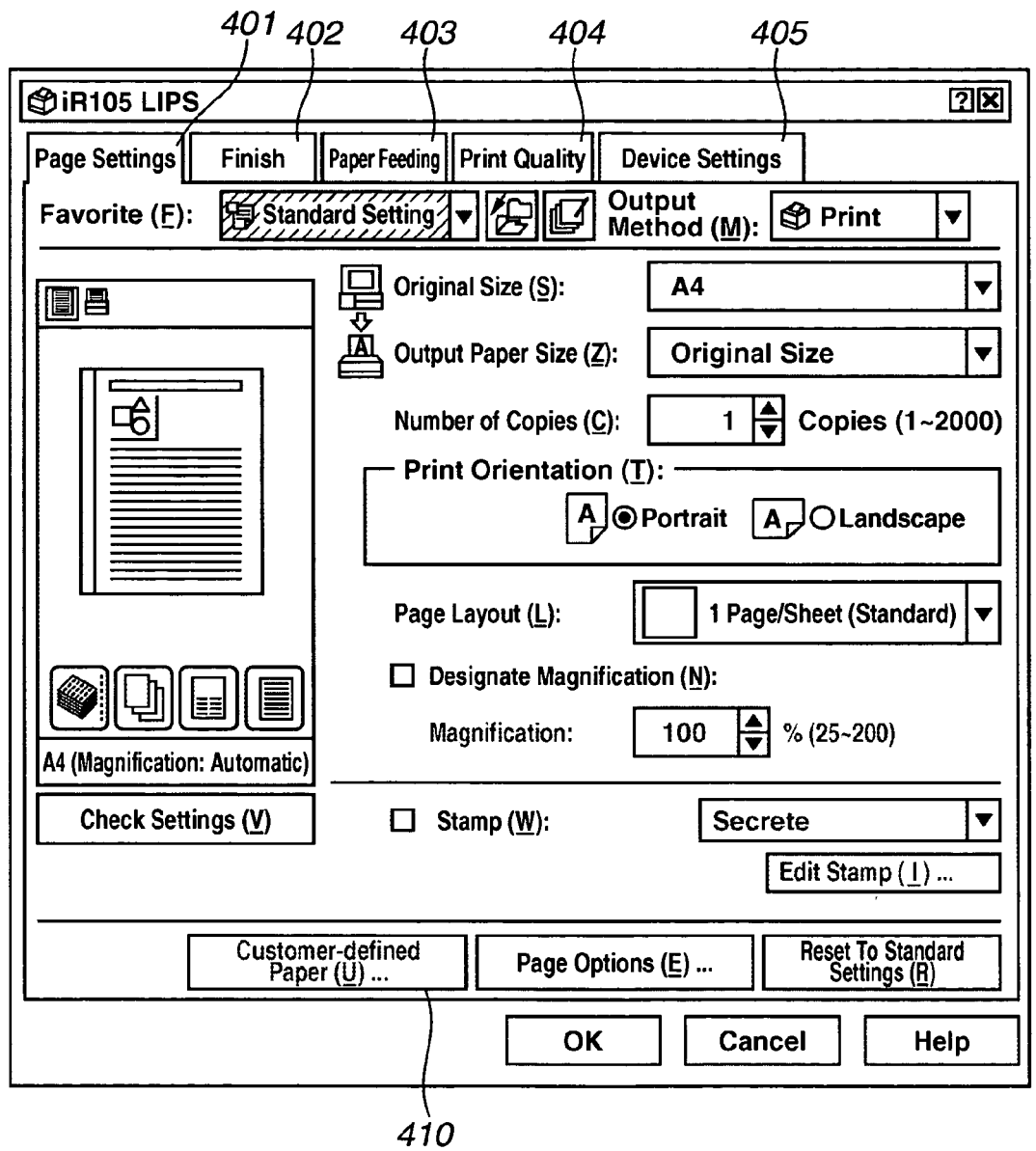
FIG. 4 is a diagram showing a printer driver UI adapted to customize an initially set value.
Figure 5:
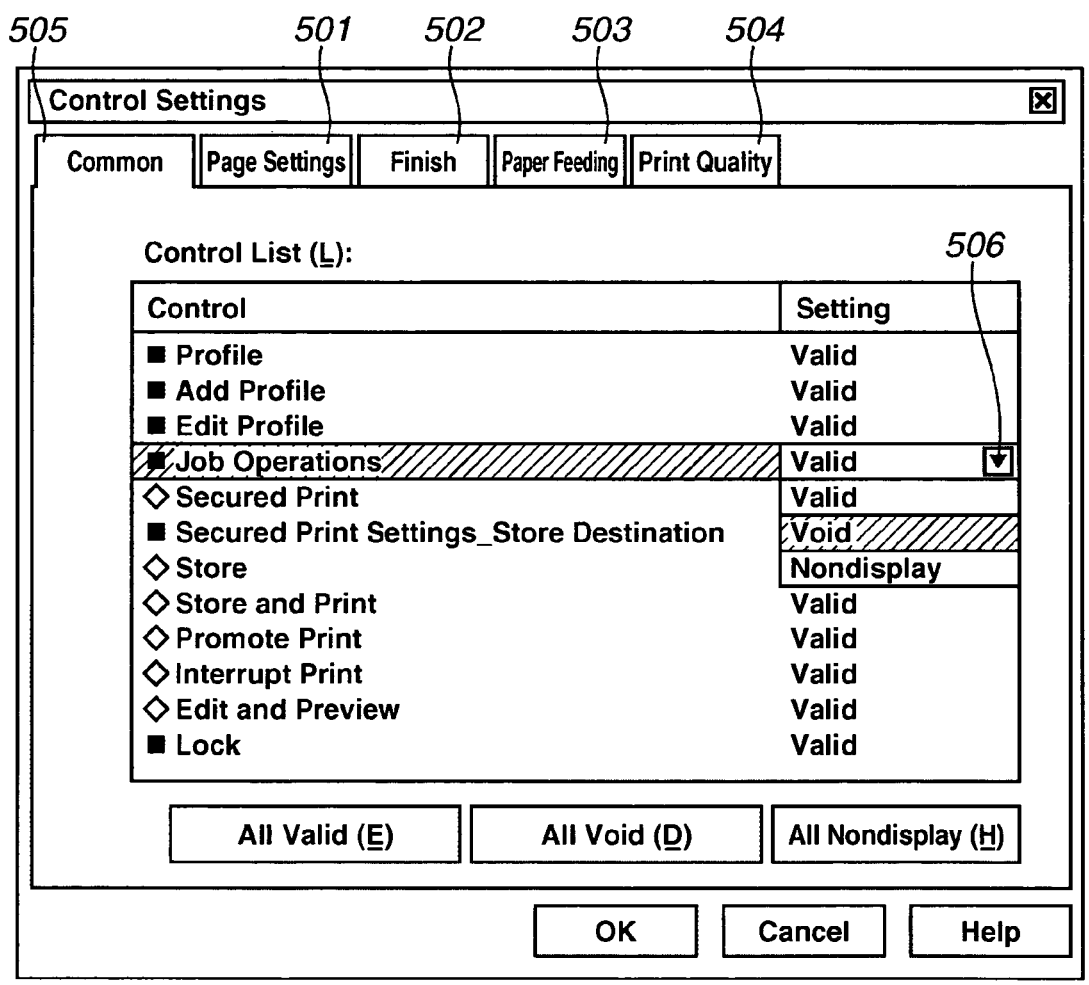
FIG. 5 is a diagram showing a document property display control setting UI.
Figure 14:
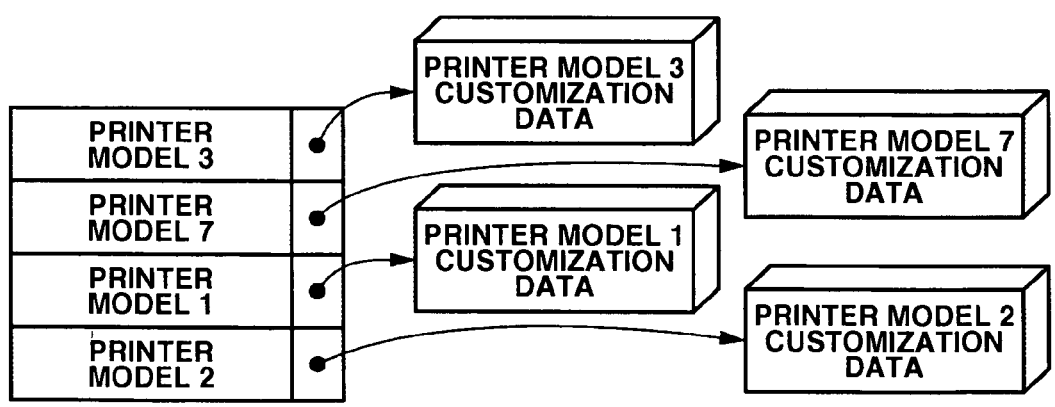
FIG. 14 is a diagram showing a form of holding customization information.
Figure 15:
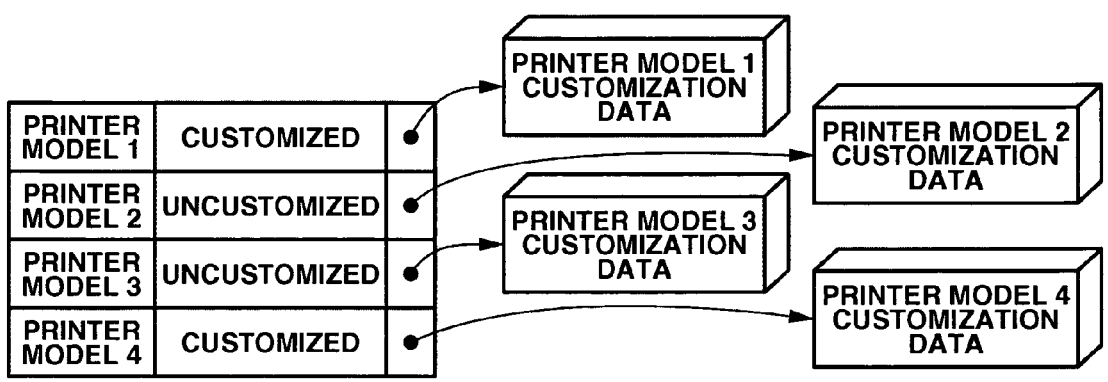
FIG. 15 is a diagram showing another form of holding customization information.
Figure 16:
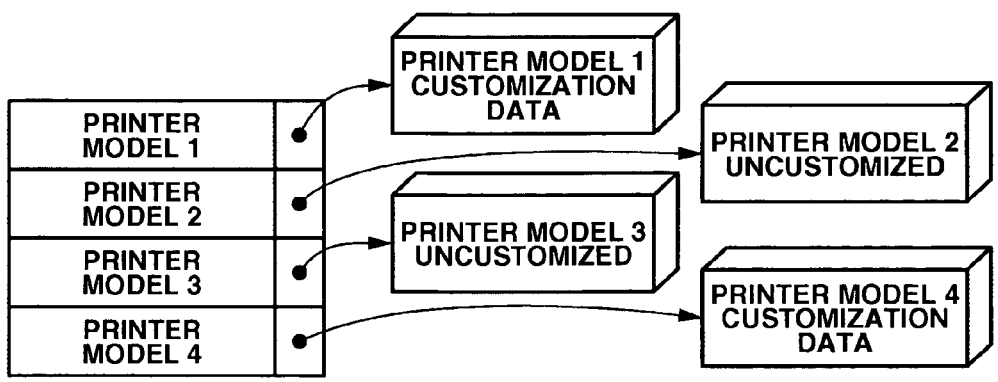
FIG. 16 is a diagram showing still another form of holding customization information.

When a setting button 350 is depressed in a UI window shown in FIG. 3, data concerning the customization, which is set from the UI window shown in FIG. 4 or 5, is held in the application program (the customization tool) as customization information (or customization data). The customization tool can hold the customization information in, for example, a file (referred to as an "INF file" (to be described later with reference to FIG. 7)) used to describe printer driver installation information. The customization tool can determine according to specifying information whether the printer driver is already customized. FIGS. 14 to 16 show a plurality of printer drivers stored in one driver set. The customization tool determines the presence/absence of the customization information corresponding to each printer driver, and customizes the printer drivers for which the customization information is already prepared (see step S608 shown in FIG. 6, and see FIG. 17).

The customization information is held in the form of a printer model name (or a printer driver corresponding to a printer model) and customization information. The customization information may be held in the form shown in FIG. 15 or 16. In the case of employing the form shown in FIG. 15, specifying information representing "CUSTOMIZED" or "UNCUSTOMIZED" is held being combined with the information representing a printer model name (or a printer driver corresponding to a printer model) and the customization information.

In the case of employing the data holding form shown in FIG. 16, the specifying information (for instance, "zero-clearance") representing "UNCUSTOMIZED" is held by the data representing the model name of an uncustomized printer. In a case where the customization tool ensures a customization holding area in an INF file, with respect to a printer model, when the setting button 350 is depressed, the customization information is held corresponding to each of the uncustomized drivers, instead of the specifying information. Depending on the specifying information and the customization information held in the customization holding area, the customization tool can determine whether the associated printer model is customized.

A dialogue box (not shown) used to designate a location for creation of a customized driver is displayed by depressing a button 330. Thus, the location for creation of a customized driver can be designated.

When a button 340 is depressed after performing various kinds of setting, a customized printer driver is created according to data representing the setting.

FIG. 4 shows a printer driver UI (an initial value customization UI) used to customize an initial value of a printer driver (hereunder referred to simply as a driver) which is displayed by depressing a button 311 in the UI shown in FIG. 3.

The customization tool functions as a setting portion of the information processing apparatus under the control of the CPU 1. This setting portion displays setting-windows, such as UI windows shown in FIG. 4, that is, a setting window for setting a document property and a device property, on the screen of the CRT display.

In the UI window used to set a printer driver ordinarily installed for Windows (registered trademark) NT4.0, or Windows (registered trademark) 2000/XP/Server 2003, both a UI of a document property used to set a document and a UI of a printer property used to set a device cannot simultaneously be displayed. However, a printer driver UI for customization of a printer driver according to the embodiment of the present invention is displayed by the customization tool utilizing a module of the printer driver. According to the embodiment of the present invention, both the UI of a document property used to set a document and the UI of a printer property used to set a device are simultaneously displayed as one UI window (see FIG. 4). As shown in FIG. 4, four kinds of UI windows, that is, a page setting UI window 401, a finish UI window 402, a paper feeding UI window 403, and a print quality UI window 404 can be displayed as a document property UI window. A device setting UI 405 can be displayed as a printer property UI. Thus, the initial values of the document property and the printer property can be set through the UI windows 401 to 405.

The UI shown in FIG. 4 is configured so that data input by users for settings which are not to be customized, are not accepted. This is denoted, for example, by a gray-out display designated by reference numeral 410.

FIG. 5 shows a diagram illustrating a document property display control setting UI. The document property display control setting UI window is displayed on the screen of the CRT display 10 of the host computer 3000 when the button 321 shown in FIG. 3 is depressed. In the example shown in FIG. 5, five kinds of display control settings can be performed, that is, a page setting UI window 501, a finish UI window 502, a paper feeding UI window 503, a print quality UI window 504, and a common UI window 505. Regarding the page setting UI window 501, the finish UI window 502, the paper feeding UI window 503, and the print quality UI window 504, the display control settings corresponding to the associated document property UI windows shown in FIG. 4 can be performed. The common UI window 505 can perform display control settings that are in common among the associated UI windows.

Reference numeral 506 designates the practical indication of control items "Job Operations". A valid indication (an ordinary display), a void indication (a Disable display of the control items at all times so that the control items cannot be operated), and a nondisplay (a Hide display) can be designated. Similarly, the valid indication (enable display of the items so that the control items can be operated), the void indication, and the nondisplay can be individually set for other control items to control the display of each of the document property UIs. Thus, displays of setting data corresponding to items in the document property UI windows can be controlled. When a user inputs the setting data, the customization tool writes the input data to a GPD (generic printer driver) file or an UPD file. An example of a void indication is a gray-out display of control items. The control items then cannot be operated by users.

The customization tool functions as a display control portion of the information processing apparatus under the control of the CPU 1. The display control portion can control the valid indication, the void indication, and the nondisplay of items in the UI according to the set property (including control items) of a document.

Figure 6:
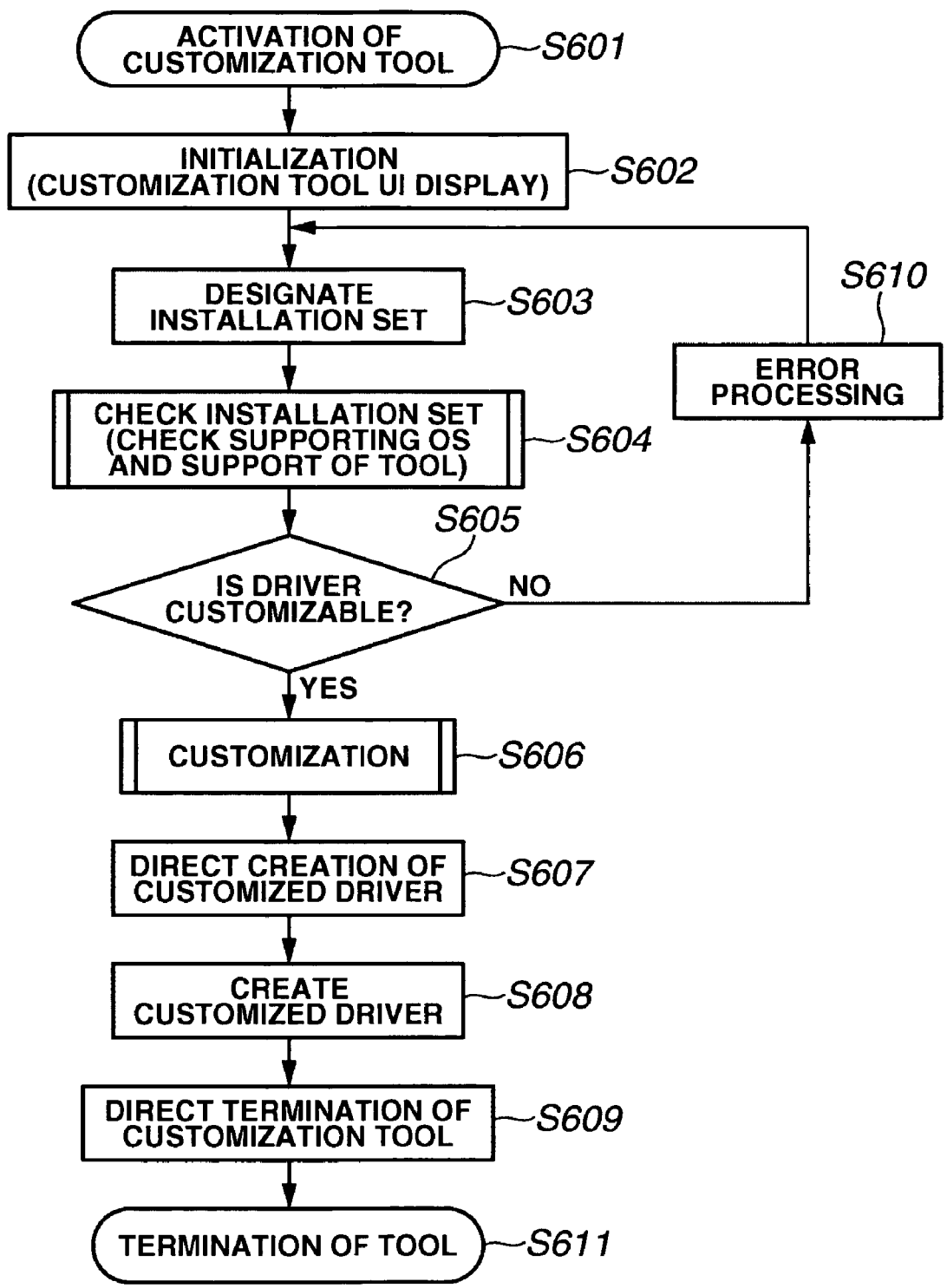
FIG. 6 is a flowchart showing a process flow of a basic operation of a customization tool.

Next, a basic operation of the customization tool is described by referring to FIG. 6. It is assumed that when a basic operation is performed, the customization tool executed by the CPU 1 of the host computer 3000 is an entity performing the basic operation.

First, in step S601, a user activates the customization tool. The initialization of the customization tool is performed. In step S602, the customization tool displays the UI window described with reference to FIG. 3 on the screen of the CRT display 10. In step S603, an installation set of a printer driver to be customized is designated by the user in the UI window shown in FIG. 3. In step S604, the designated installation set is checked.

In the checking of the installation set, the customization tool determines from the INF files 701, 710, and 720 (which describe installation information on printer drivers shown in FIG. 7), whether the OS can support the designated installation set, and whether the designated printer driver is to be customized by the customization tool.

The information processing apparatus is configured to customize a device driver which is adapted to control a printer, by setting properties (initial values of document properties used to perform settings of a document and printer properties used to perform settings of a device). Preferably, the information processing apparatus includes a specifying portion adapted to specify a plurality of device drivers, and a setting portion adapted to set, in response to one device-driver customization instruction, property information, which corresponds to a document or device property, for the plurality of device drivers specified by the specifying portion. In this case, the aforementioned portions of the information processing apparatus perform processing by executing the customization tool under the control of the CPU 1.

FIG. 7 is a diagram illustrating a description in each of the INF files that describe installation information on printer drivers. Each of the INF files includes module description information (not shown). It is assumed that according to the module description information, the customization tool can specify a module which performs UI processing of the printer driver. In FIG. 7, reference numeral 700 designates a part of the INF file for Windows (registered trademark) 98/ME. Reference numeral 710 denotes a part of the INF file for Windows (registered trademark) NT4.0. Reference numeral 720 designates a part of the INF file for Windows (registered trademark) 2000/XP/Server 2003. The customization tool executed by the CPU 1 determines that the printer driver is a printer driver for Windows (registered trademark) 98/ME, in the case where a value 730 set for "Signature" in the INF file 700 is a character-string resource ("$CHICAGO$).

Also, the customization tool determines that the printer driver is a printer driver for Windows (registered trademark) NT4.0 or a printer driver for Windows (registered trademark) 2000/XP/Server 2003 in the case where a value set for "Signature" 740 or 750 in the INF file 710 or 720 is a character-string resource ("$Windows (registered trademark) NT$). Then, the customization tool refines the determination processing and determines that the printer driver is a printer driver for Windows (registered trademark) NT4.0 in a case where a character-string resource set for "DISK1" 760 or 770 in the INF file 710 or 720 includes a character-string "NT". Otherwise, the customization tool determines that the printer driver is a printer driver for Windows (registered trademark) 2000/XP/Server 2003.

The INF file corresponding to a customizable printer driver includes a character-string resource indicating that the printer driver supports customization. Thus, when making the determination, the customization tool judges whether a character-string resource is included in the INF file corresponding to the customizable printer driver. Consequently, the customization tool can determine whether a printer driver supports customization.

Turning back to FIG. 6, in step S605, in the case where the customization tool determines that a printer driver does not support the customization (NO in step S605), the process proceeds to step S610 wherein error processing is performed. Then, the process returns to step S603 again, in which an installation set is designated.

On the other hand, in a case where the customization tool determines in step S605 that a printer driver supports the customization (YES in step S605), the process advances to step S606. Then, the customization tool controls the CRTC 6 to display the UI window, which has been described in the foregoing description of FIG. 3, 4, or 5, on the screen of the CRT display 10 and enables the setting for the customization of the printer driver. Input data set in the foregoing description of FIG. 3, 4, or 5 is employed as the customization data. The customization data is set in a GPD file that can be read by the printer driver. When the printer driver is installed in the apparatus and is set in an operating condition, the printer driver reads the set value contained in the GPD file. Then, the customized value in the GPD file is reflected to the printer driver. For example, a frequently used print setting value (for instance, "two-side" and "2 in 1") is preset and is preliminarily reflected to the printer driver. Thus, the frequently used print setting value or a customized default print setting value is set in the printer driver. The customized default print setting value is set in the driver when the driver is instructed to bring the operating condition into a non-operating condition.

Figure 17:
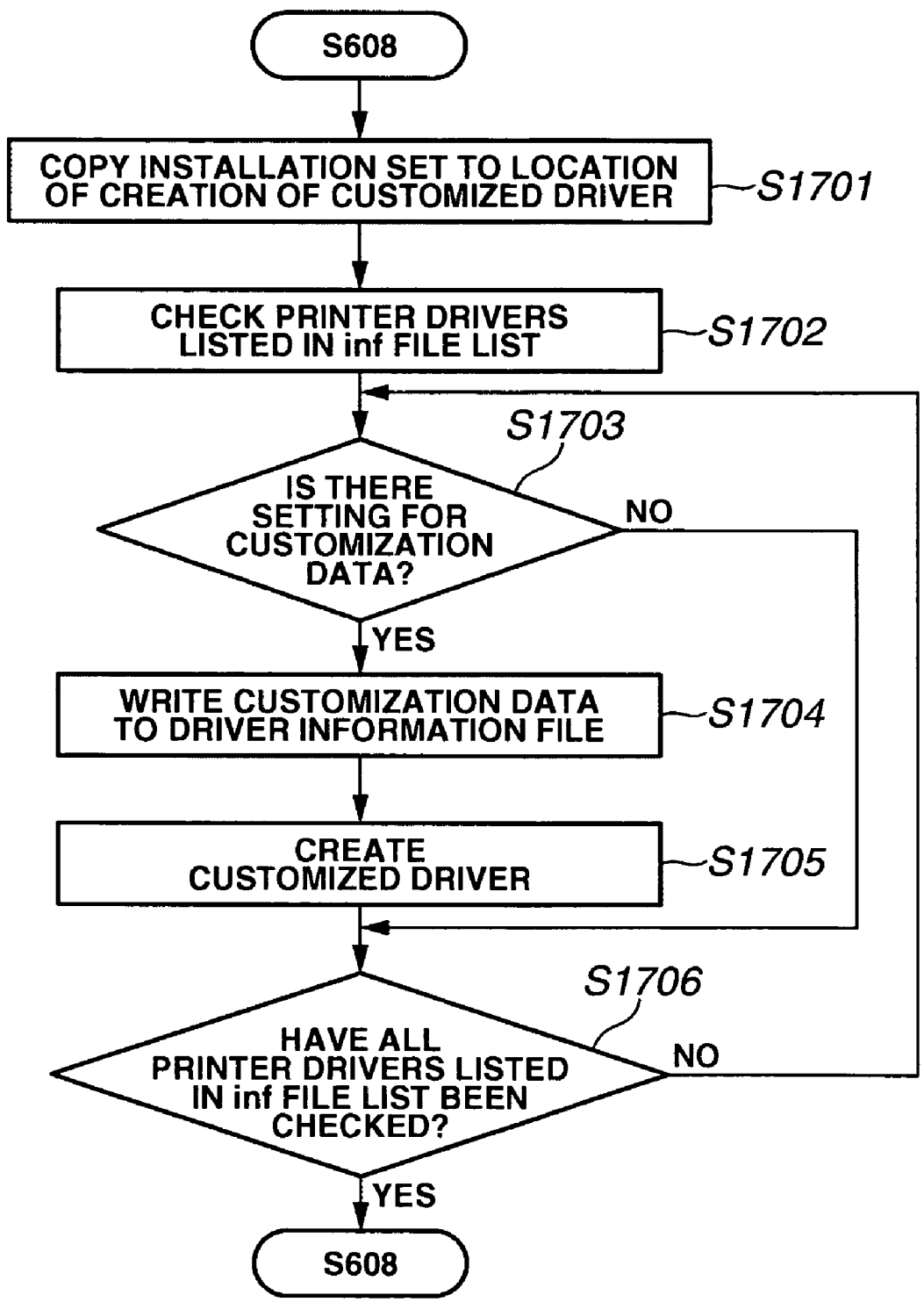
FIG. 17 is a flowchart showing a process flow of an operation for collectively customizing a plurality of printer drivers included in one driver set.

When an instruction is given to create a customized driver in step S607, the creation of the customized driver is performed in step S608. FIG. 17 is a flowchart illustrating a practical operation performed in step S608 and also illustrating the flow of a process of collectively customizing a plurality of printer drivers included in one driver set.

In the process of creating a customized driver, the customization tool first copies an installation set from the location of customization to the location of creation of a customized driver in step S1701. Subsequently, to specify a device driver for which customization data is set, in step S1702 the customization tool checks whether customization data is set corresponding to each of the printer drivers in the order of the printer drivers listed in the INF file (for example, in the case shown in FIG. 14, in the order of the printer model 3, the printer model 7, the printer model 1, and the printer model 2). The customization tool can determine, according to the presence/absence of specifying-information, whether the customization data is set (which has been described with reference to FIGS. 15 and 16). The customization tool may specify a device driver, for which customization data is set, in response to a selection direction externally inputted by, for example, a user. In this case, information described in the INF file, which represents, for example, the kinds of printer drivers, and the location of storage of customization data, is inputted by a user.

If customization data is set for a corresponding printer driver (YES in step S1703), the process proceeds to step S1704, wherein the customization tool writes customization data to a driver information file (referred to also as a UPD file or GPD file) included in the installation set to which the customization is copied. Then, a customized driver is created in step S1705. Subsequently, if it is determined in step S1706 that the checking has not been performed on all of the listed printer drivers (NO in step S1706), the process returns to step S1703 wherein it is checked whether customization data is set for the next printer driver. If set, the customization tool repeats an operation of writing the customization data to a UPD file corresponding to the associated printer driver. When it is determined that the checking has been completed on all of the listed printer drivers (YES in step S1706), the process illustrated in the flowchart shown in FIG. 17 is finished. Then, the process returns to step S608 shown in FIG. 6. As a result of the aforementioned process, the customization tool creates customized drivers, to which customization data is reflected, from a plurality of printer drivers included in one driver set.

The information processing apparatus is configured to customize a device driver (a printer driver), which is adapted to control a printer, by setting properties (initial values of document properties used to perform settings of a document and printer properties used to perform settings of a device). The information processing apparatus includes a specifying portion adapted to specify a plurality of device drivers, and a setting portion adapted to set, in response to one device-driver customization instruction, property information, which corresponds to a document or a device property, to the plurality of device drivers specified by the specifying portion. Each of the aforementioned portions of the information processing apparatus performs processing by executing the customization tool under the control of the CPU 1.

Figure 9:
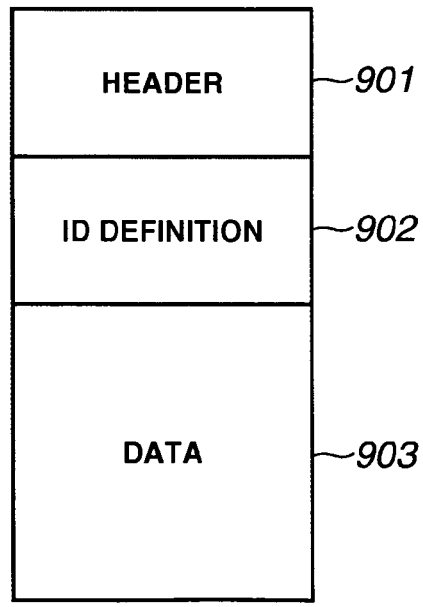
FIG. 9 is a diagram showing a data format of a universal printer driver (UPD) file of a printer driver.

FIG. 9 is a diagram showing a data format of a driver information file (a UPD file or GPD file), which is one file constituting a printer driver. As shown in FIG. 9, the UPD file (and also GPD file) includes a header 901, an ID definition field 902, and data field 903. The ID definition field 902 stores a set of the ID (identification information) of data stored in the data field 903 and the location (or address) of storage of the data. The sets of the number corresponding to the number of IDs are stored therein. The customization tool according to the present embodiment changes the value of data, which corresponds to the ID defined for customization. In a case where the ID of the customization data to be used is not defined in the ID definition field 902, a new ID corresponding to the customization data to be used is added to the ID definition field 902.

The customized printer driver is adapted to read the GPD file (or the UPD file), to which the customized data is written by the customization tool, at installation or at first activation. The customized printer driver is also adapted to read the data 903 stored corresponding to a predetermined ID stored in the ID definition field 902 of the GPD file (or UPD file). For example, it is assumed that an ID indicating "CUSTOMIZED" is stored in the ID definition field 902 of the UPD file created by the customization tool and that an address X is stored therein as a location for storage of data.

In a case where the ID information representing "CUSTOMIZED" is stored in the ID definition field 902, the printer driver supporting the customization is adapted to read an address corresponding to the information upon completion of the installation or at the first activation. Thus, upon completion of the installation or at the first activation, this printer driver reads the address X of the corresponding data from the ID definition field 902 when "CUSTOMIZED" is included in the ID definition 902 of the UPD file. Subsequently, the printer driver further reads a data structure in a device mode, which is actual driver setting data, from the address X in the data field 903. The address X may be an absolute address. Alternatively, the data format may be adapted so that the leading address of the data field 903 is stored in the header 901, and that an offset address from the leading address of the data field 903 is set at the address X.

The customization tool functions as the display control portion of the information processing apparatus under the control of the CPU 1. The display control portion refers to the driver information file (the UPD file or the GPD file) of the printer driver at the activation of the printer driver and can display a UI window on the screen of the CRT 10 according to the customization data set in the UPD file.

In the present embodiment, the customization tool writes initial value data (data set by the UI windows 401 to 404 shown in FIG. 4) concerning the document properties used to set a document, initial value data (data set by the UI window 405 shown in FIG. 4) concerning the printer properties used to set a device, and data (data set by the UI window shown in FIG. 5) concerning a method of displaying a control on the UI window regarding a document property, to the UPD file as the customization data. The customized printer driver reads the UPD file, which is generated by the customization tool, upon completion of installation, or at the first activation, and then operates according to the customization information. Consequently, the operation environment for the customized printer driver can easily be constructed.

Turning back to FIG. 6, if termination is directed by the user in step S609 after the customized driver is created in step S608, an operation of the customization tool is finished in step S611.

Figure 8:
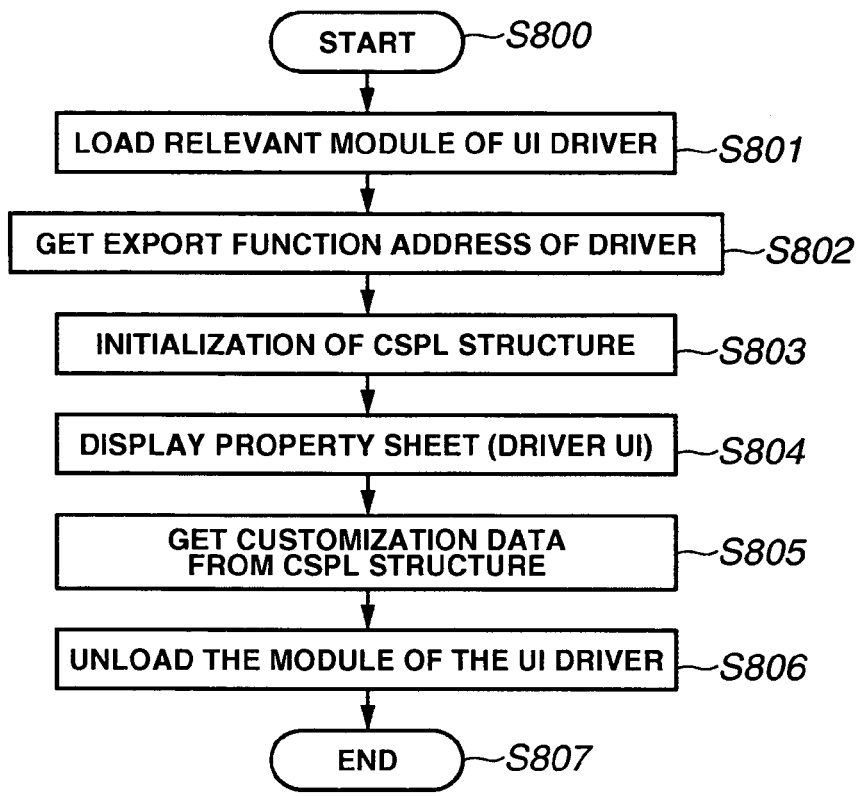
FIG. 8 is a flowchart showing a process flow of an operation of displaying a printer driver customization UI.

Next, a process of displaying a UI for customization of a printer driver by the customization tool executed by the CPU 1 is described below by referring to FIG. 8. The customization tool executed by the CPU 1 of the host computer 3000 is the entity performing this operation.

When the button 311 shown in FIG. 3 is depressed, the customization tool specifies a module of the printer driver, which performs a UI process, according to module description information included in the INF file and loads the module into the memory in step S801 so that the module can be called by the customization tool.

Next, in step S802, an address of a function exported by the module of the printer driver is obtained. A CSPL structure (not shown) for exchange between the customization tool and the printer driver, which supports the customization, is initialized in step S803. Various kinds of information are stored in the CSPL structure so that the UI of the printer driver can be controlled even when the printer driver is not installed.

Thereafter, an operation of displaying a property sheet (a driver UI for customization) is performed in step S804. At that time, the function for displaying the property sheet is called so that both the document property and the printer property can simultaneously be customized, as illustrated in FIG. 4, and that both of the property sheets are displayed in one UI window.

When the driver UI window for customization is closed by the user, the information set by the driver UI for customization is held by the CSPL structure. Thus, the customization tool obtains information on the printer driver, which corresponds to the held information, from the CSPL structure (including a DeviceOption structure and a Devmode structure) in step S805.

The customization tool has a part which functions as an obtaining portion adapted to obtain data representing the printer driver corresponding to the document properties or to the device properties under the control of the CPU 1. The obtaining portion holds data concerning the setting of the printer driver, and can obtain information on the printer driver by transmitting and receiving data to and from the data holding portion (the CSPL structure) which is capable of transferring data. At that time, the obtaining portion can cause the data holding portion (the CSPL structure) to hold data corresponding to the document properties or the device properties set by the UI windows (see FIGS. 3 to 5), and can obtain the information on the printer driver, which corresponds to the properties, from the data holding portion (the CSPL structure) as setting-information for customization.

The customization tool writes the data held by this data holding portion to a UPD file that will be described later. When called, the printer driver determines whether a customized UPD file is present. In a case where the printer driver determines that a customized UPD file is present, the printer driver reads customized print setting data and UI control data contained in the UPD file. Thus, the customization setting of the printer driver is achieved.

That is, according to the setting information for customization, the customization tool part functioning as the display control portion calls a UI module of the printer driver. The called UI module causes the CRT display 10 to display a customized UI window, which passes customization information that is set through the UI windows shown in FIGS. 3 to 5, that designates data used to control the display of a control item, and represents the default values of print setting information, by using a pseudo API that will be described later.

Printer property setting information is set in the DeviceOption structure (not shown) and document property setting information is set in the Devmode structure (not shown) as customization setting information. The customization tool obtains the stored setting information as the customization setting information.

Thereafter, in step S806, the module previously loaded to the memory in step S801 is unloaded therefrom. Subsequently, the display of the driver UI for customization is terminated in step S807.

The process described in the process flow, which is illustrated in the flowchart, varies slightly with the OS corresponding to the printer driver. For example, Windows (registered trademark) NT4.0 and Windows (registered trademark) 2000/XP/Server 2003 utilize a Common Property Sheet UI that is a component of a computer system on which an OS runs. Thus, a Common Property Sheet UI function is called after necessary preprocessing is performed. On the other hand, according to Windows (registered trademark) 98/ME, a Property Sheet function is called and a UI is displayed after necessary preprocessing is performed. A basic process flow is illustrated in FIG. 8.

Figures 10A, 10B:
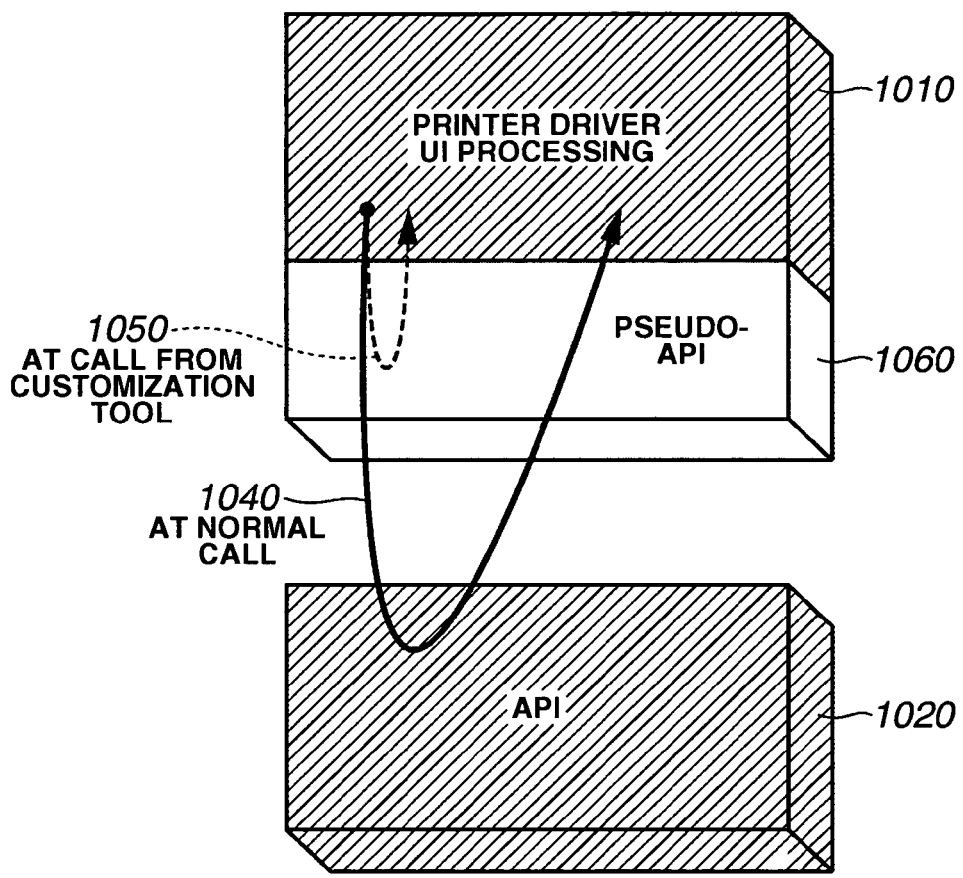
FIG. 10A is a diagram showing ways of calling an application program interface (API) to be supplied to a printer driver.
FIG. 10B is a table showing the relation between API functions and corresponding pseudo API functions.

FIG. 10A is a diagram showing ways of calling a Windows (registered trademark) Application Program Interface (API) provided in a printer driver. In the case where a printer driver is installed in the apparatus, the Windows (registered trademark) API (referred to simply as "API" in the drawings) is called in a case 1040 (at an ordinary call) in a printer driver UI process 1010. In the case where a printer driver supporting customization is not installed in the apparatus, and where pseudo Windows (registered trademark) API (referred to simply as "pseudo API" in the drawings) 1060 is called by the customization tool in a case 1050 in a printer driver UI process 1010, a process performed by the Windows (registered trademark) API is simulated in a pseudo manner by using the associated pseudo Windows (registered trademark) API. Then, resultant data is returned to the printer driver UI process 1010.

FIG. 10B is a table 1030 showing the corresponding relation between the Windows (registered trademark) API functions and the associated pseudo API function names (respectively referred to as "API" and "pseudo API name" in this figure). It is assumed that this corresponding relation can be preliminarily set in the installed printer driver.

Normally, a program controlling the user interface for the printer driver is adapted to call the Windows (registered trademark) API according to data inputted to the printer driver. The present embodiment is configured so that the pseudo API can be called although the Windows (registered trademark) API cannot be called in a state in which the printer driver is not installed.

When the pseudo Windows (registered trademark) API is called from the customization tool, the pseudo Windows (registered trademark) API simulates a process performed by the Windows (registered trademark) API and returns this process to the printer driver UI process 1010. In a case where the printer driver UI is called as an ordinary driver UI after the printer driver is installed for an OS, an ordinary Windows (registered trademark) API 1020 is called and the process is returned to the printer driver UI process 1010.

Figure 11:
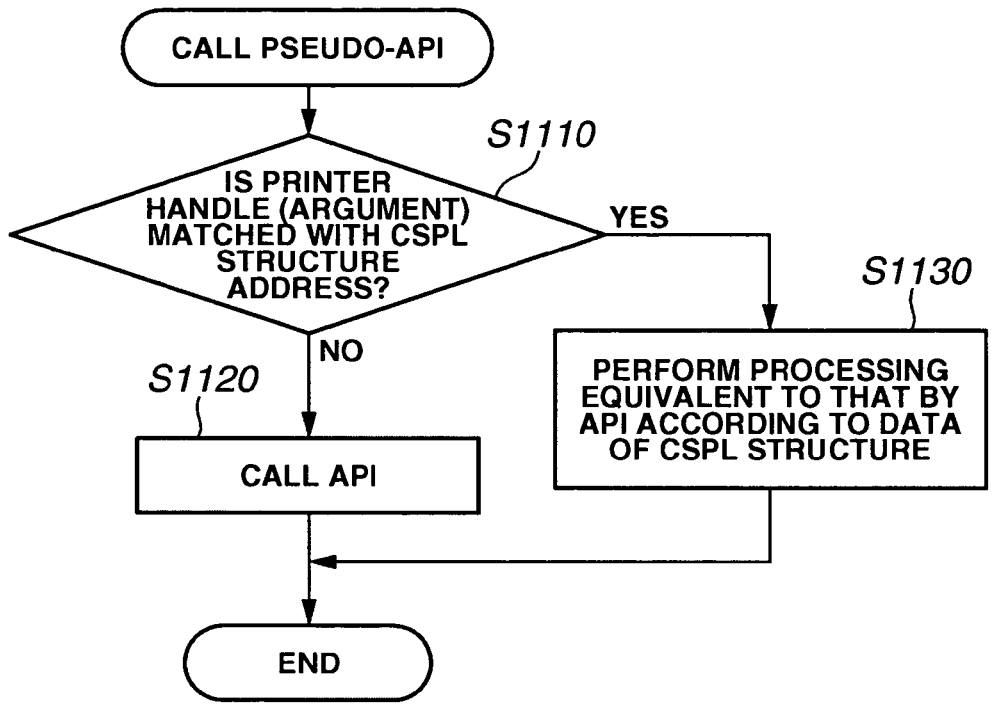
FIG. 11 is a flowchart showing a process flow of an operation of calling a pseudo Windows (registered trademark) API.

FIG. 11 is a flowchart showing a flow of a process of calling the pseudo Windows (registered trademark) API (referred to simply as "pseudo API" in the drawings). The customization tool executed by the CPU 1 of the host computer 3000 is the entity performing the operation in this process.

First, in step S1110, the customization tool determines whether the printer handle (argument) included in the argument of the pseudo Windows (registered trademark) API function is matched with address information of the CSPL structure (hereunder referred to simply as "address information"), which is transferred when called from the customization tool. The method of determining is adapted so that a leading member of the CSPL structure indicates the size of the CSPL structure. Thus, the transferred printer handle (the argument) is referred to being treated as the leading address of the CSPL structure. In a case where the printer handle of the argument is matched with the size of the CSPL structure, the customization tool determines that the printer handle (the argument) is the address of the CSPL structure (YES in step S1110). The UI module of the printer driver stores data representing processing results, for example, data representing the values of print setting items and the designation of the display of controls, which are inputted through the UI, in the structure designated by the handle. Then, the process is finished.

In a case where the printer handle of the argument is not the address of the CSPL structure (NO in step S1110), an ordinary operation of the printer driver is performed. Thus, an operation of calling the Windows (registered trademark) API (referred to simply as "API" in the drawings) is performed in step S1120. Then, the process is finished.

If it is determined in step S1110 that the printer handle of the argument is matched with the address of the CSPL structure (YES in step S1110), the process proceeds to step S1130 wherein the Windows (registered trademark) pseudo API is called from the customization tool. In this case, when the printer driver is not installed, the Windows (registered trademark) API cannot be called. Thus, in step S1130, a process equivalent to that performed by the Windows (registered trademark) API is performed by the pseudo Windows (registered trademark) API. Then, a result of the equivalent process is returned to the printer driver UI process 1010. Then, the equivalent process is finished.

Thus, the customization tool functions as a selection portion of the information processing apparatus under the control of the CPU 1. The selection portion selects an application program interface (Windows (registered trademark) API or the pseudo Windows (registered trademark) API), which is to be used (or called), according to the address information representing the leading address held by a data holding portion (the CSPL structure).

Figure 12:
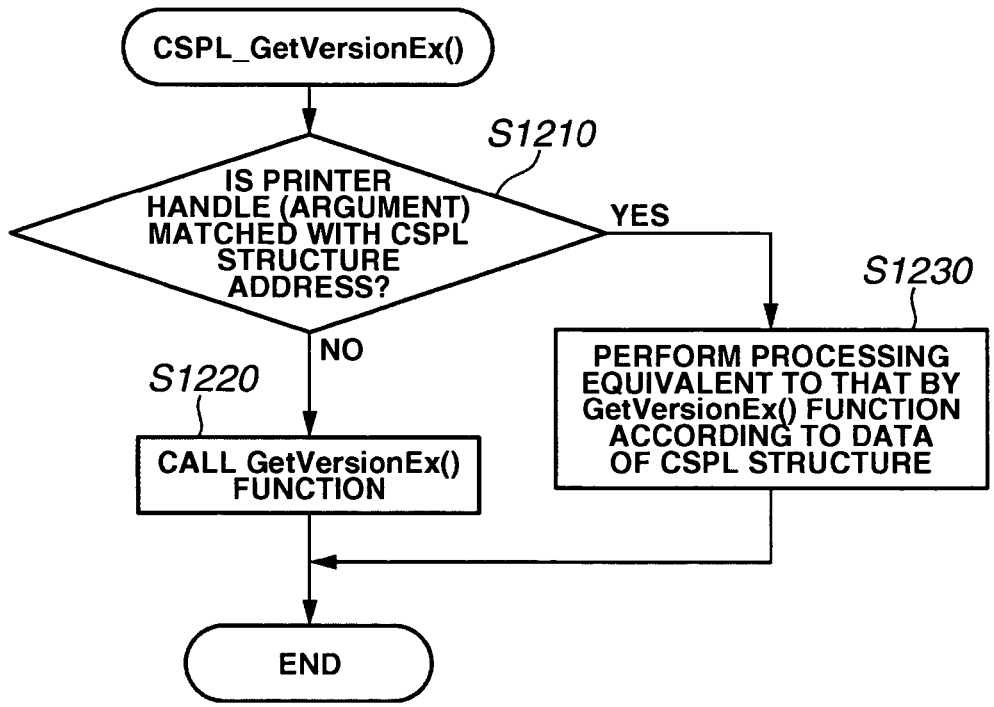
FIG. 12 is a flowchart showing a process flow of an operation of calling a CSPL_GetVersionEx function as an example of the pseudo Windows (registered trademark) API function.

FIG. 12 is a flowchart showing a process flow of an operation of calling a CSPL_GetVersionEx function (see 1040 shown in FIG. 10B) from the printer driver as an example of the pseudo Windows (registered trademark) API function. It is assumed that when this operation is performed, the printer driver UI is called by the customization tool executed by the CPU 1 of the host computer 3000 is an entity performing this process. Also, the CSPL_GetVersionEx function is called by the customization tool function. The Windows (registered trademark) API function simulated by the CSPL_GetVersionEx function is a Windows (registered trademark) GetVersionEx (see the table 1030 shown in FIG. 10B). This Windows (registered trademark) API function performs a process of returning information on the version of the OS running on the host computer to the process 1010 performed at the side of the printer driver UI.

First, in step S1210, the CSPL_GetVersionEx function in the customization tool determines whether the printer handle, which is the argument of the function, is the address of the CSPL structure, which is transferred when the API function is called. If not (NO in step S1210), the process advances to step S1220 wherein the Windows (registered trademark) GetVersionEx function 1040, which operates for an ordinary printer driver, is called. This determination method is similar to that described in the description of the step S1110 shown in FIG. 11. Then, the process is finished.

On the other hand, if it is determined in step S1210 that the argument of the function is matched with the address of the CSPL structure (YES in step S1210), the process proceeds to step S1230 wherein a process to be performed by the GetVersionEx function is performed in a pseudo manner (that is, a process equivalent to that performed by the GetVersionEx function is performed) according to information on the OS corresponding to the printer driver held in the CSPL structure.

The CSPL_GetVersionEx function returns processing results, which are the same as those obtained by the GetVersionEx function, to the printer driver UI module in step S1230. The same goes for other functions.

For example, the application program interface (the pseudo Windows (registered trademark) API) is called corresponding to the document property or the device property set in the UI windows shown in FIGS. 3 to 5. The application program interface performs a process, which is performed in the printer driver corresponding to the set document property or the set device property, in a pseudo manner (that is, performs a process equivalent to the process performed by the Windows (registered trademark) API).

After the processing is performed in step S1230 or S1220, the process illustrated in the flowchart shown in FIG. 12 is finished.

Consequently, for example, in a case where a process concerning the control of the UI of the module of the Windows (registered trademark) 98/ME driver is performed by calling the API from the customization tool, an actually running OS is the Windows (registered trademark) 2000/XP/Server 2003 corresponding to the customization tool. However, information, which indicates that the OS corresponding to the driver module is the Windows (registered trademark) 98/ME, is included in the CSPL structure. Thus, the value indicating the "Windows (registered trademark) ME" is returned thereto as information representing the version of the OS. Thus, occurrence of a breakdown of the UI control process of the Windows (registered trademark) 98/ME driver module can be prevented.

That is, objects to be customized are printer drivers of the Windows (registered trademark) 98/ME and driver information provided by, for example, INF files and driver user interface modules. In the present embodiment, the customization tool is supported by Windows (registered trademark) 2000/XP/Server 2003. It is assumed that the environment, in which the customization tool is executed, is controlled by one of these OSs. The CSPL structure is initialized in step S803 shown in FIG. 8. At that time, information, which indicates, for example, that the OS supporting the driver module is Windows (registered trademark) 98/ME is written to the CSPL structure as OS version information representing the version of the OS. Consequently, the CSPL structure contains the information (that is, the OS version information) indicating that the OS supporting the driver module is Windows (registered trademark) 98/ME. Thus, the CSPL_GetVersionEx function accesses the OS version information contained in the CSPL structure and returns a value, which represents "Windows (registered trademark) ME", to the calling printer driver UI module.

The same goes for other pseudo Windows (registered trademark) APIs. Even in a case where troubles can be caused in the process of the driver module UI control by calling the Windows (registered trademark) API because no printer driver is actually installed, the process performed by the Windows (registered trademark) API functions is simulated by the pseudo functions (the pseudo API functions). Thus, an operation of the Windows (registered trademark) API can virtually be reflected to the UI control.

Although it is not explicitly described, the Windows (registered trademark) 98/ME printer driver is a module that operates in a 16-bit environment, so that the UI processing is performed in a 16-bit environment. However, the Windows (registered trademark) 98/ME printer driver customized according to the present embodiment performs substantial UI-processing in a 32-bit environment by utilizing the thunking-up function of a thunking mechanism. Thus, the customization tool according to the present embodiment can relatively easily call a UI-processing function operating in the 32-bit environment, in which the substantial UI-processing is performed, and also can relatively easily display and control the Windows (registered trademark) 98/ME UI.

That is, the customization tool obtains properties including print setting data. Then, the customization tool registers a device driver being operable in the OS. That is, the customization tool exercises an administrative right of the OS to set the obtained properties, which include the print setting data, in the device driver so that the device driver can be read. The device driver is not installed by registering the properties in a registry region managed by the OS. When the properties are set therein, the device driver is stored in a user region of a file system managed by the OS.

The properties are stored in the UPD file by the customization tool. The created UPD file constitutes the installation set, together with the printer drivers, the printer driver UI modules, and the INF files to be customized. The created installation set is distributed to each of client computers through recording media and communication media. An installer performs installation according to information described in the INF file. The installer copies a value corresponding to each setting item read from the UPD file as the value of a corresponding item of each of the devmode structure and the deviceOption structure. The printer driver and the printer driver UI module operate by referring to the value of each of items stored in the devmode structure and the deviceOption structure.

The aforementioned process is performed by the customization tool that is an example of an application program. The customization tool responds to information inputted through the device driver in place of the operating system.

This pseudo proxy response made by the customization tool permits the device driver to recognize the response made by the application program as a response made by the OS without causing error processing, and to continue the subsequent setting processing using data inputted from a user.

The customization tool includes a pseudo API corresponding to the device driver. Also, the customization tool can set properties, which include the print setting data, in device drivers intended for plural kinds of operating system (for example, Windows (registered trademark) NT, and Windows (registered trademark) 95.

The customization tool can set information, which relates to the print setting and is obtained by the customization tool, in a plurality of device drivers in response to one instruction.

As described above, the pseudo API according to the present embodiment allows the customization tool to behave like an operating system to the device driver so that the device driver appears to be installed in an operating condition for the operating system. When the customization tool does not respond to the device driver in a pseudo manner, the device driver switches to an error processing condition. Consequently, the customization tool can continue the customization of the device driver without installing the device driver.

Figure 13:
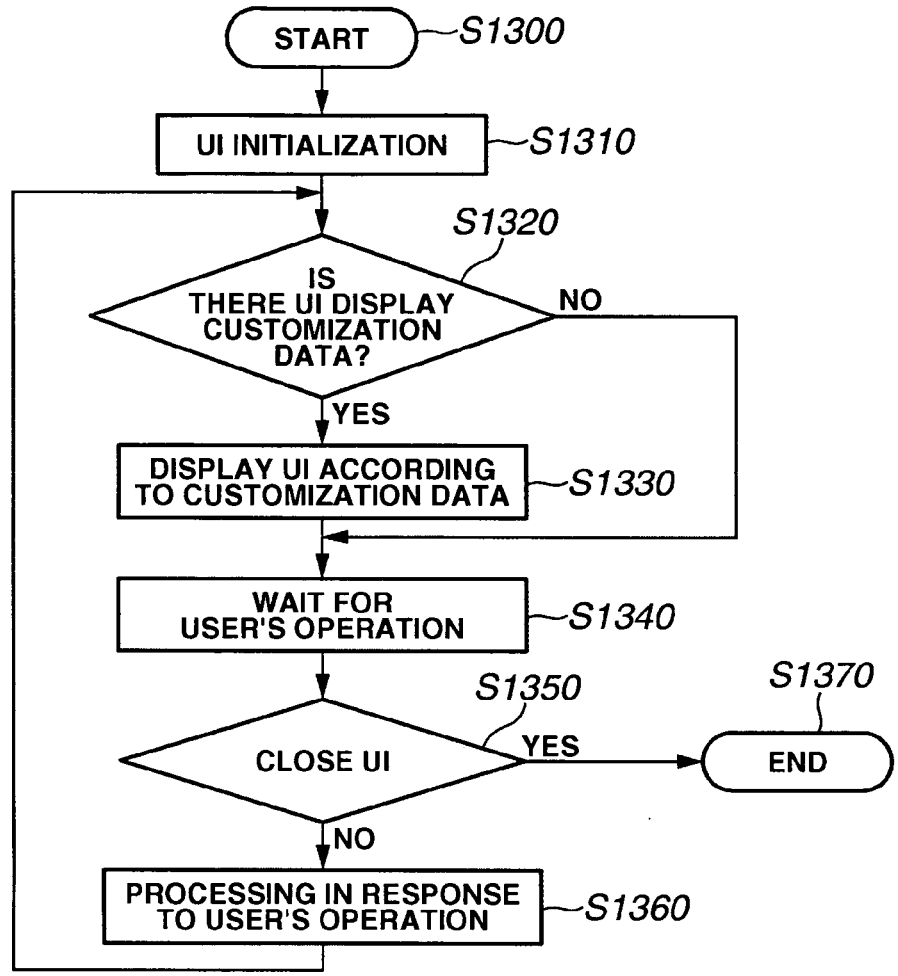
FIG. 13 is a flowchart showing a process flow of an operation of controlling a UI used to set a property of a printer driver corresponding to customization.

FIG. 13 is a flowchart showing the flow of a process of controlling the UI used to set the property of a printer driver corresponding to the customization. The customization tool executed by the CPU 1 of the host computer 3000 is the entity performing the process. In a procedure shown in FIG. 13, the pseudo API functions illustrated in FIGS. 11 and 12 are called. Thus, the display of property sheets, the acquisition of parameters, and the input of set values are realized.

First, in step S1300, the customization tool is activated when a UI control direction is inputted. Then, in step S1310, the UI is initialized. Subsequently, in step S1320, if customization information concerning UI display is included in the driver information file shown in FIG. 9 (YES in step S1320), the process proceeds to step S1330. The control direction is passed to the UI display control (Disable Control and Hide Control). Thus, in step S1340, the apparatus is caused to wait for a user's operation. On the other hand, if there is no driver information file (NO in step S1320), the process skips step S1330. Then, in step S1340, the apparatus is caused to wait for a user's operation.

Thereafter, in step S1340, the apparatus stands by until a user performs an operation. If a user performs an operation for closing the UI window (YES in step S1350), the UI processing is finished in step S1370. If the user' operation is of another kind (NO in step S1350), UI control processing corresponding to the user's operation is performed in step S1360. Subsequently, the process returns to step S1320.

The property information inputted through the UI is stored again in the printer driver information file (that is, the UPD file) through the CSPL structure. At that time, the customization code (Z) illustrated in FIG. 3 is stored in the printer driver information file, together with a preliminarily identification code.

Consequently, the customization data concerning the method of displaying the control items designated in the window shown in FIG. 5 is held in the driver information file shown in FIG. 9. Thus, the UI control display according to the customization data can be achieved.

The present embodiment is adapted so that the customization data is written to the driver information file that is the UPD file. However, in a case where the printer driver can be referred to and also can be analyzed, driver information files are not limited to UPD files. For example, a UPD file is employed in Longhorn, which is the next Windows (registered trademark) version, as the standard driver information file of the printer driver, and the customization information may be incorporated into this file.

According to the present embodiment, a plurality of printer drivers can simultaneously be customized by one customization completion instruction after a customization operation is performed on the printer driver.

Even when a printer driver is provided for an OS that does not support the customization, a customized printer driver, which reflects user' desired customization, can be created.

The customization of the initial setting values of the printer driver can be performed by a UI window equivalent to the UI window of the printer driver. Thus, the customization of the initial setting values can easily be achieved. The efficiency of a user's operation and the operability of the apparatus can be enhanced by controlling the valid indication, the void indication, and the nondisplay of the display items in the UI window to reflect the customization.

The customized drivers are configured similarly to uncustomized drivers of the installation set. Thus, the customized drivers can operate as drivers in what is called a Point and Print environment in Windows (registered trademark) operating systems manufactured by Microsoft (registered trademark) Corporation or in Windows (registered trademark) Longhorn that is the next Windows (registered trademark) OS. Consequently, the versatility of the customized drivers can be improved.

The features of the present invention can be achieved by providing a storage medium (or a recording medium), on which a software program code implementing the functions of the aforementioned embodiments is stored, to a system or the apparatus, whose computer (or a CPU or MPU) reads and executes the program code stored in the storage medium.

In this case, the program code itself read from the storage medium implements the functions of the aforementioned embodiments. Thus, the storage medium, which stores the program code, can constitute the present invention. The functions of the aforementioned embodiment are implemented not only by executing the read program code in the computer but by performing part or all of actual processing according to instructions, which are issued by the program code, by an OS (Operating System) running on the computer.

Also, the functions of the aforementioned embodiment are also implemented by performing part or all of the actual processing by a CPU or the like, which is provided in a function expansion board inserted into the computer or in a function expansion unit connected to the computer, according to instructions issued by the program code that is read from the storage medium after being written to a memory provided on the function expansion board or on the function expansion unit.

In a case where the present invention is applied to the aforementioned storage medium, the storage medium stores program codes respectively corresponding to the flowcharts (FIGS. 6, 8, 11 to 13, and 17) described in the foregoing description of the embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An information processing apparatus, which is configured to customize a device driver that is adapted to control a device by setting a property thereof, comprising:
   a specifying module adapted to specify a plurality of device drivers that have been previously created;
   an operation module adapted to perform a customization operation on each of the plurality of device drivers prior to installation of the plurality of device drivers; and
   a setting module adapted to set property information for each device driver in the plurality of device drivers specified by the specifying module, in response to a single device-driver customization completion instruction inputted after the customization operation by the operation module is performed on each of the plurality of device drivers specified by said specifying module, prior to installation of the plurality of device drivers,
   wherein at least one of the specifying module, the operation module and the setting module are executed by a computer circuit, and
   wherein at least one of the specifying module, the operation module and the setting module is operated via a pseudo application program interface that emulates application program interface operations.

2. The information processing apparatus according to claim 1, wherein the setting module determines whether property information corresponding to the plurality of device drivers is set, and
   wherein the setting module writes the property information to an information file.

3. The information processing apparatus according to claim 1, further comprising a display control module adapted to display a customized user interface window according to data corresponding to the set property information in a display unit.

4. The information processing apparatus according to claim 3, wherein the display control module controls at least one of a valid indication, a void indication and a nondisplay indication of items in the user interface window according to property information set by the setting module.

5. The information processing apparatus according to claim 4, wherein when the device driver is activated, the display control module displays the user interface window according to property information obtained by referring to an information file corresponding to the device driver.

6. The information processing apparatus according to claim 1, wherein the plurality of device drivers respectively correspond to a plurality of models of devices and are included in a same device driver set, and
   wherein the setting module writes the property information to a setting file that can be read by the plurality of device drivers.

7. The information processing apparatus according to claim 1, wherein the specifying module reads a list of device drivers or models of devices from predetermined data stored in a predetermined memory, and
   wherein the specifying module specifies a device driver for which the property information is set by the setting module.

8. The information processing apparatus according to claim 1, wherein the specifying module specifies a device driver, for which the property information is set by the setting module, according to an external selection instruction.

9. An information processing apparatus as claimed in claim 1 in which the device is a printer.

10. A method configured to customize a device driver for controlling a device, by setting a property thereof, comprising:
using a processor to perform the following:
a specifying step of specifying a plurality of device drivers that have been previously created;
an operation step of performing a customization operation on each of the plurality of device drivers prior to installation of the plurality of device drivers; and
a setting step of setting property information for each device driver in the plurality of device drivers specified in the specifying step, in response to a single device-driver customization completion instruction inputted after the customization operation by the operation step is performed on each of the plurality of device drivers specified in the specifying step, prior to installation of the plurality of device drivers,
wherein at least one of the specifying step, operating step and setting step is performed via a pseudo application program interface that emulated application program interface operations.

11. The method according to claim 10, wherein, in the setting step, it is determined whether property information corresponding to the plurality of device drivers is set, and
wherein in the setting step, the property information is written to an information file.

12. The method according to claim 10, further comprising a display control step of displaying a customized user interface window according to data corresponding to the set property information in a display unit.

13. The method according to claim 12, wherein in the display control step, at least one of a valid indication, a void indication and a nondisplay indication of items in the user interface window is controlled according to property information set in the setting step.

14. The method according to claim 13, wherein in the display control step, when the device driver is activated, the user interface window is displayed according to property information obtained by referring to an information file corresponding to the device driver.

15. The method according to claim 10, wherein the plurality of device drivers respectively correspond to a plurality of models of devices which are included in the same device driver set, and
wherein in the setting step, the property information is written to a setting file that can be read by the plurality of device drivers.

16. The method according to claim 10, wherein in the specifying step, a list of device drivers or models of devices is read from predetermined data stored in a predetermined memory, and
wherein in the specifying step, a device driver, for which the property information is set in the setting step, is specified.

17. The method according to claim 10, wherein in the specifying step, a device driver, for which the property information is set in the setting step, is specified according to an external selection instruction.

18. A method as claimed in claim 10 in which the device is a printer.

19. A computer-readable storage medium which stores a control program, which when loaded into a computer and executed performs a method as claimed in claim 10.

20. An information processing apparatus, configured to create an installation set including driver information used to install a plurality of device drivers, comprising:
a specifying unit adapted to specify a plurality of device drivers that have been previously created to be customized prior to installation of the plurality of device drivers;
an operation unit adapted to perform a customization operation on each of the plurality of device drivers prior to installation of the plurality of device drivers;
a setting unit adapted to set property information by customizing print setting data for each of the plurality of device drivers specified by said specifying unit according to the customization operation performed by the operation unit, prior to installation of the plurality of device drivers;
a producing unit adapted to produce an installation set including the plurality of device drivers each having the property information set by said setting unit; and
a storage medium configured to store the installation set produced by the producing unit,
wherein at least one of the specifying unit, the operation unit and the setting unit is operated via a pseudo application program interface that emulates application program interface operations.

21. The information processing apparatus according to claim 20, wherein said specifying unit specifies the plurality of device drivers by using driver information preliminarily read into a customization program.

22. The information processing apparatus according to claim 20, wherein the driver information is used at installation of the plurality of device drivers having the property information set by said setting unit.

23. An information processing method, configured to create an installation set including driver information used to install a plurality of device drivers, comprising:
using a processor to perform the following:
a specifying step of specifying a plurality of device drivers that have been previously created to be customized prior to installation of the plurality of device drivers;
an operation step of performing a customization operation on each of the plurality of device drivers prior to installation of the plurality of device drivers;
a setting step of setting property information by customizing print setting data for each of the plurality of device drivers specified in said specifying step according to the customization operation performed by the operation step, prior to installation of the plurality of device drivers; and
a producing step of producing an installation set including the plurality of device drivers each having the property information set by said setting unit,
wherein at least one of the specifying step, the operation step and the setting step is performed via a pseudo application program interface that emulates application program interface operations.

24. The information processing method according to claim 23, wherein each of the plurality of device drivers is specified in said specifying step by using driver information preliminarily read into a customization program.

25. The information processing method according to claim 23, wherein the driver information is used at installation of the plurality of device drivers having the property information set in said setting step.

26. A computer-readable storage medium comprising a control program stored thereon, the control program configured to cause a computer to perform an information processing method of creating an installation set including driver information used to install a plurality of device drivers, said information processing method, comprising:

a specifying step of specifying a plurality of device drivers that have been previously created to be customized prior to installation of the plurality of device drivers;

an operation step of performing a customization operation on each of the plurality of device drivers prior to installation of the plurality of device drivers;

a setting step of setting property information by customizing print setting data for each of the plurality of device drivers specified in said specifying step according to the customization operation performed by the operation step, prior to installation of the plurality of device drivers; and a producing step of producing an installation set including the plurality of device drivers each having the property information set by said setting unit, wherein at least one of the specifying step, the operation step and the setting step is performed via a pseudo application program interface that emulates application program interface operations.

* * * * *